(12) United States Patent
Goodgold et al.

(10) Patent No.: US 6,418,512 B1
(45) Date of Patent: Jul. 9, 2002

(54) METHOD AND SYSTEM FOR REPORTING DISK UTILIZATIONS FOR DISK SUBSYSTEMS

(75) Inventors: Stuart Robert Goodgold; Ruth Enid Azevedo, both of San Jose; Bruce McNutt, Gilroy, all of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/386,252

(22) Filed: Aug. 31, 1999

(51) Int. Cl.[7] .............................. G06F 12/00; G06F 9/00
(52) U.S. Cl. ......................... 711/114; 714/6; 709/104; 709/107
(58) Field of Search .................... 714/6; 711/112, 711/114; 348/7; 709/102, 104, 107, 203, 208, 219, 220, 221, 222, 223, 224, 225, 226

(56) References Cited

U.S. PATENT DOCUMENTS

| | | | |
|---|---|---|---|
| 5,247,633 A | 9/1993 | Nissimov et al. | 711/4 |
| 5,351,246 A | 9/1994 | Blaum et al. | 714/6 |
| 5,388,108 A | 2/1995 | DeMoss et al. | 714/6 |
| 5,542,066 A | 7/1996 | Mattson et al. | 711/136 |
| 5,583,561 A * | 12/1996 | Baker et al. | 348/7 |
| 5,596,458 A | 1/1997 | Emo et al. | 300/48 |
| 5,634,109 A | 5/1997 | Chen et al. | 711/143 |
| 5,651,133 A | 7/1997 | Burkes et al. | 711/114 |
| 5,659,704 A | 8/1997 | Burkes et al. | 711/114 |
| 5,696,934 A | 12/1997 | Jacobson et al. | 714/5 |
| 5,754,756 A | 5/1998 | Watanabe et al. | 714/6 |
| 5,870,237 A | 2/1999 | Emo et al. | 360/48 |
| 6,079,028 A * | 6/2000 | Ozden et al. | 714/6 |

* cited by examiner

Primary Examiner—Matthew Kim
Assistant Examiner—B. R. Peugh
(74) Attorney, Agent, or Firm—Sawyer Law Group LLP

(57) ABSTRACT

The present invention provides a method and system for reporting disk utilization in a computer system. The method includes collecting at least one parameter pertaining to a disk array in a disk subsystem by a processor in the disk subsystem; transferring the at least one parameter from the processor to an open system host; and calculating disk utilization based upon the at least one parameter. The method and system is able to provide disk utilization which is understandable to the open system host. In a preferred embodiment, the disk utilization is provided by collecting the relevant parameters from the microcode in the processor of the disk subsystem, and then calculating the average disk utilization per disk based upon the parameters. Thus, an open system host is able to obtain a useful characteristic for determining the performance of the disk subsystem.

38 Claims, 4 Drawing Sheets

METHOD AND SYSTEM FOR REPORTING DISK UTILIZATIONS FOR DISK SUBSYSTEMS

FIELD OF THE INVENTION

The present invention relates to computer systems, and more specifically to disk subsystems in computer systems.

BACKGROUND OF THE INVENTION

Mainframe disk subsystems are well known in the art. FIG. 1 illustrates a mainframe computer system with a conventional disk subsystem. The computer system 100 includes a disk subsystem 102 and a host 104. The disk subsystem 102 includes a disk array 106, a cache 108, and a processor 110 which controls the functioning of the disk subsystem 102. The host 104 comprises software specifically for communication with the disk subsystem 102, and does so by interfacing with the processor 110. One of the functions of the processor 110 is to provide statistics and other characteristics of the disk array 106 to the host 104. Examples of disk characteristics of interest to the host 104 include a table of ownership, the amount of space used on the disks 106, and performance characteristics. An important performance characteristic is disk utilization, which tells the host 104 how busy are each disk in the array 106. In a mainframe environment, as illustrated in FIG. 1, obtaining the disk utilization characteristic is well known in the art. However, a problem arises when the disk subsystem attempts to communicate with open system hosts, such as hosts which run UNIX, Windows NT, or some other type of open operating system. The parameters relevant to disk characteristics sent from the processor 110 to the host 104 is not in a format which is understandable by the open system host. Thus, in an open systems environment, the open system host is unable to obtain disk characteristics, including the disk utilization characteristic.

Accordingly, there exists a need for a method and system for providing parameters for a disk subsystem to an open system host. The method and system should be able to provide disk utilization which is understandable to the open system host. The present invention addresses such a need.

SUMMARY OF THE INVENTION

The present invention provides a method and system for reporting disk utilization in a computer system. The method includes collecting at least one parameter pertaining to a disk array in a disk subsystem by a processor in the disk subsystem; transferring the at least one parameter from the processor to an open system host; and calculating disk utilization based upon the at least one parameter. The method and system is able to provide disk utilization which is understandable to the open system host. In a preferred embodiment, the disk utilization is provided by collecting the relevant parameters from the microcode in the processor of the disk subsystem, and then calculating the average disk utilization per disk based upon the parameters. Thus, an open system host is able to obtain a useful characteristic for determining the performance of the disk subsystem.

DETAILED DESCRIPTION

The present invention provides a method and system for providing parameters for a disk subsystem to an open system host. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
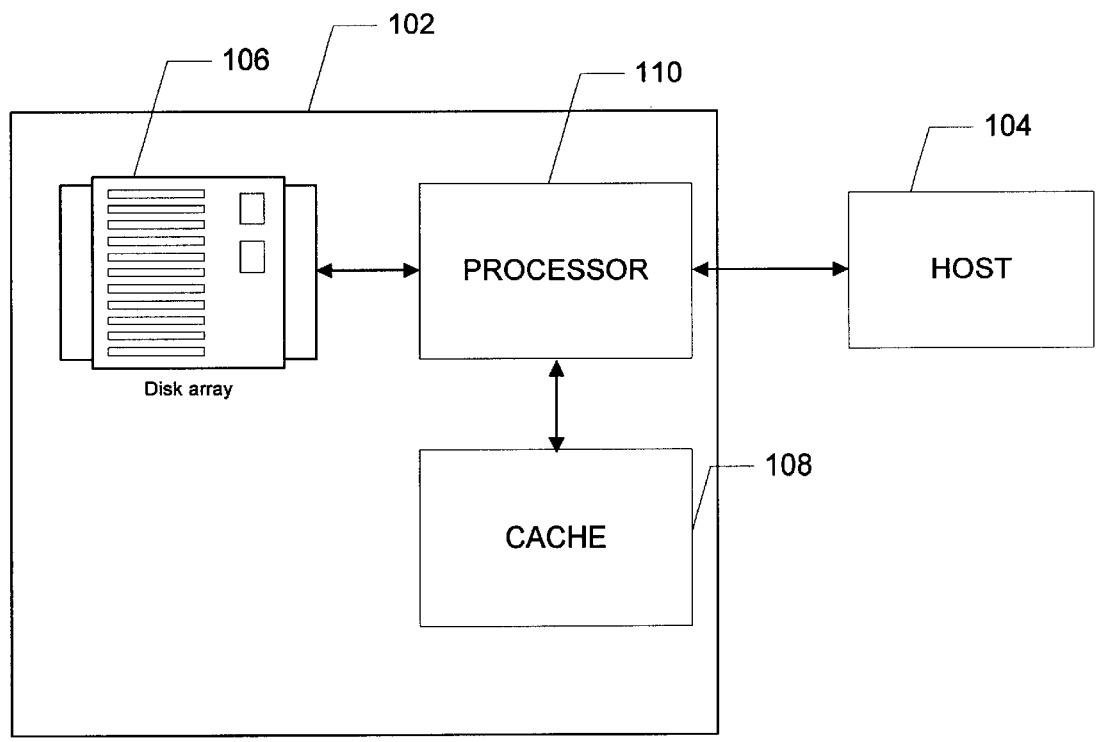
FIG. 1 illustrates a mainframe computer system with a conventional disk subsystem.
Figure 2:
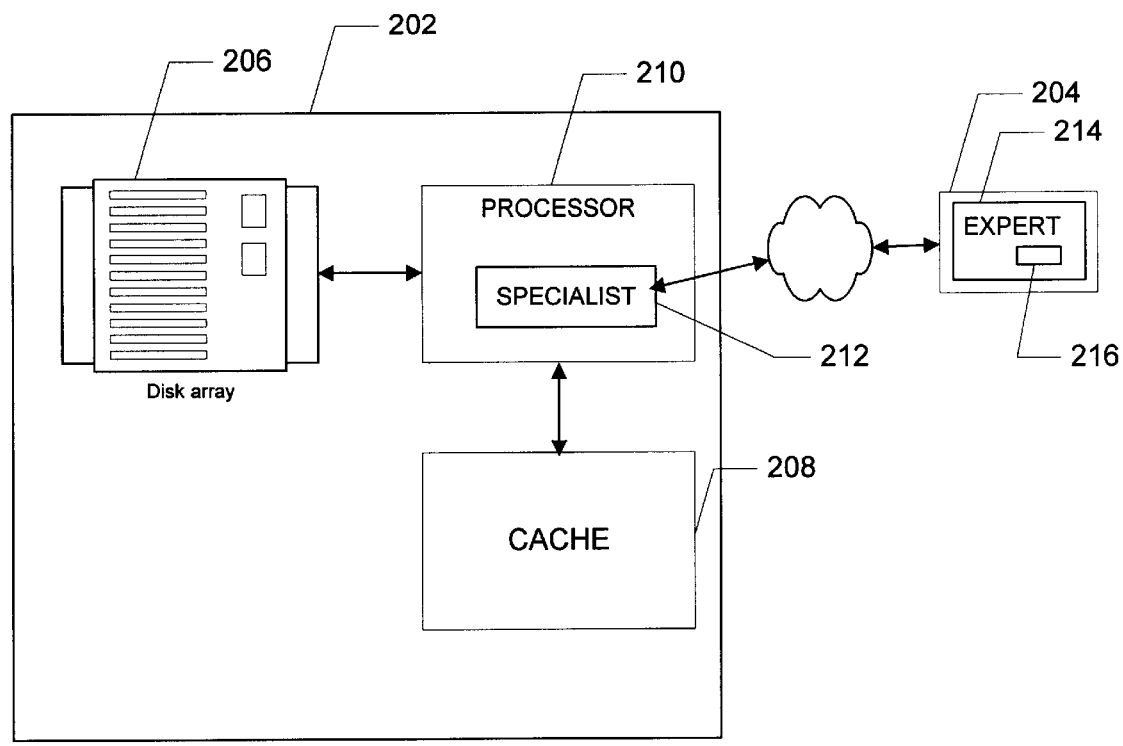
FIG. 2 illustrates a preferred embodiment of a computer system with a disk subsystem in accordance with the present invention.

FIG. 2 illustrates a preferred embodiment of a computer system with a disk subsystem in accordance with the present invention. The computer system 200 comprises a disk subsystem 202 and an open system host 204. Traditional mainframe hosts (not shown) may be communicating with the disk subsystem 202 as well. The disk subsystem 202 comprises a disk array 206, a cache 208, and a processor 210 which controls the functioning of the disk subsystem 202. The open system host 204 communicates with the disk subsystem 202 by interfacing with the processor 210 via an Internet connection. Software resides in the processor 210 and the open system host 204 to facilitate this communication; the processor 210 comprises the specialist software 212, and the open system host 204 comprises the expert software 214. One of the functions of the specialist 212 is to gather certain parameters from the microcode (not shown) within the processor 210 which pertain to disk characteristics and transfers them to the expert 214 in the open system host 204. One of the functions of the expert 214 is to receive the parameters from the specialist 212 and to generate reports concerning disk characteristics based upon the parameters. The reports may be in tabular or graphical form. For the computer system 200, microcode within the processor 210 does not provide disk utilization directly. Thus, the expert 214 comprises a software routine 216 which calculates disk utilization from the parameters provided by the microcode via the specialist 212. An example of a disk subsystem which may be used in the computer system 200 is the ENTERPRISE STORAGE SERVER (ESS) disk subsystem developed by INTERNATIONAL BUSINESS MACHINES CORPORATION. In the ESS disk subsystem, the disk array 206 is a RAID array, which is well known in the art.

Figure 3:
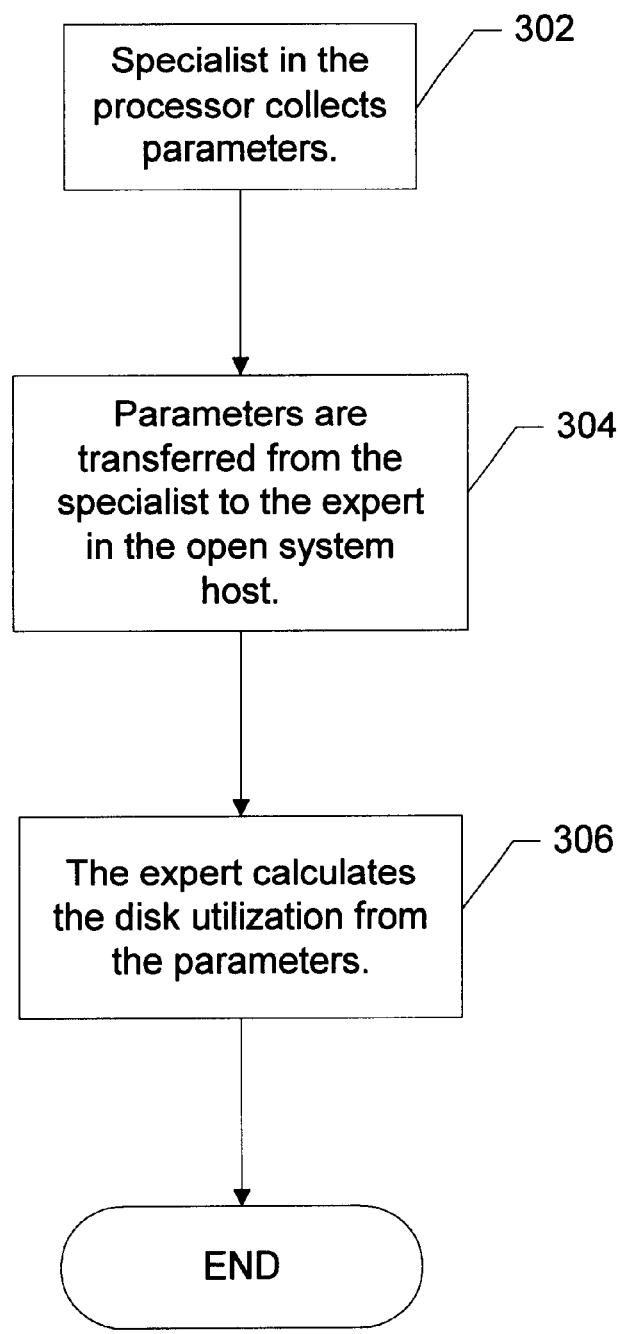
FIG. 3 is a flow chart illustrating a preferred embodiment of reporting disk utilization in accordance with the present invention.

FIG. 3 is a flow chart illustrating a preferred embodiment of reporting disk utilization in accordance with the present invention. First, the specialist 212 in the processor 210 of the disk subsystem 202 collects the parameters, via step 302. Next, the parameters are transferred from the specialist 212 to the expert 214 in the open system host 204, via step 304. Then, the expert 214 calculates the disk utilization from the parameters, via step 306. In the preferred embodiment, the calculation is performed with a disk utilization routine 216 in the expert 214. The disk utilization, along with other disk characteristics, may be displayed by the expert 214 in the form of a report.

Figure 4:
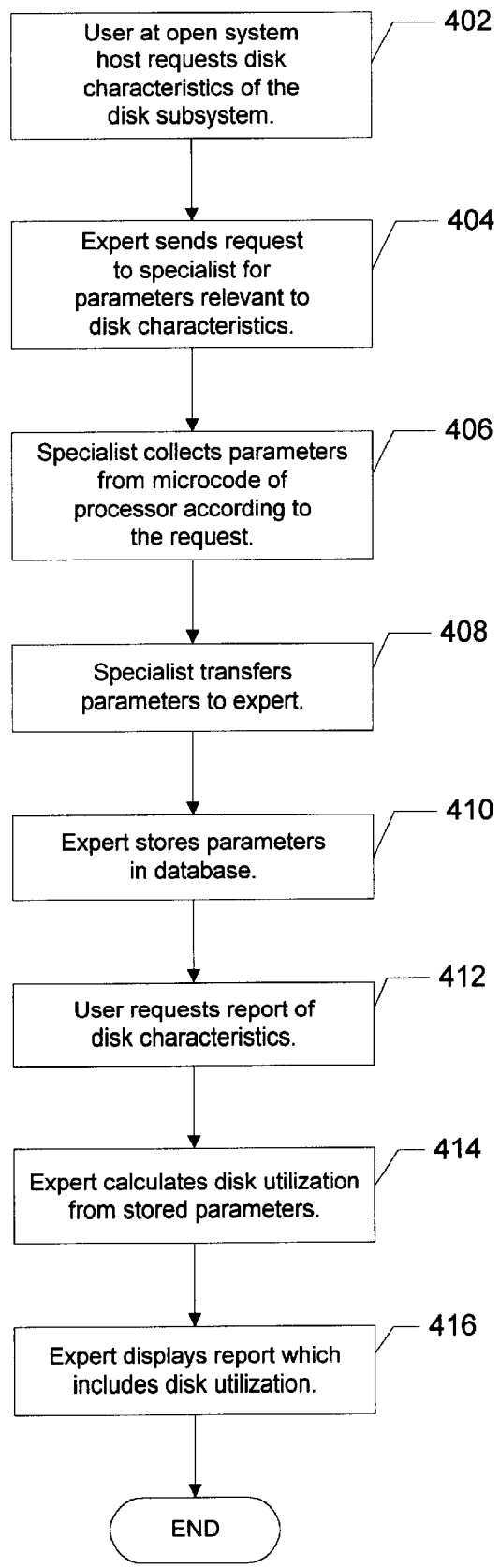
FIG. 4 is a flow chart illustrating in more detail the reporting of disk utilization in accordance with the present invention.

FIG. 4 is a flow chart illustrating in more detail the reporting of disk utilization in accordance with the present invention. First, once the user logs into the open system host 204, the user requests disk characteristics for the disk subsystem 202, via step 402. This request may be in the form of a schedule. For example, the user may request that certain disk characteristics be collected from the disk subsystem 202 every 10 minutes, or every hour. One of the disk characteristics which may be requested by the user is disk utilization. Next, the expert 214 sends a request to the specialist 212 for the disk characteristics, via step 404. When the user requests disk utilization, the expert 214 requests that the parameters in the microcode which is relevant to disk utilization be collected. For a computer system 200 which uses the ESS disk subsystem, the relevant microcode parameters comprise the following:

T=time interval in seconds

N=number of disks in a RAID array

MR=milliseconds of read time in the time interval

MW=milliseconds of write time in the time interval

W=total number of writes in the time interval

S=number of stride write destages in the time interval

The specialist 212 then collects the parameters from the microcode according to the request, via step 406. Next, the specialist 212 transfers the parameters to the expert 214, via step 408. Thus if the user requests that disk characteristics be collected every 10 minutes, then at 10 minute intervals, the parameters would be collected from the microcode and sent to the expert 214. Each time the expert 214 receives the parameters, they are stored in a database (not shown) on the open system host 204, via step 410. When the user is ready to view the disk characteristics, the user requests a report from the expert 214, via step 412. The expert 214 then calculates disk utilization for each disk in the array 206 from the parameters stored in the database, via step 414, using the disk utilization routine 216. For a computer system 200 which uses an ESS disk subsystem, the formula for the average disk utilization per disk is as follows:

$$U=1/(1000*T*N)*[MR+(MW/2W-S)*(4*(W-S)+N*S)]$$

The formula is derived based upon the fields which are provided by the microcode and their meaning, and an understanding of the internal working of the hardware of the disk subsystem 202. For example, the formula takes into account how a read, write, and stride write destages are performed by the disk subsystem 202, and how the cache 208 and the disk array 206 are involved. For this formula, U is a number between 0 and 1. Once calculated, the expert 214 then displays the report, which includes disk utilization, via step 416. The report may be in a tabular or graphical form. Disk utilization for each disk in the array 206 may be displayed as a percentage, representing the amount of time a disk is in use during the interval of time, T.

The parameters of the microcode described above is part of a proposed standard currently before the Storage Network Industry Association (SNIA). If the parameters are adopted as the standard, then the method and system of the present invention may be used to conform disk utilization reporting to this standard.

A method and system for providing parameters for a disk subsystem to an open system host has been disclosed. The method and system is able to provide disk utilization which is understandable to the open system host. The disk utilization is provided by collecting the relevant parameters from the microcode in the processor of the disk subsystem, and then calculating the average disk utilization per disk based upon the parameters. Thus, an open system host is able to obtain a useful characteristic for determining the performance of the disk subsystem.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reporting disk utilization in a computer system, comprising the steps of:

(a) collecting at least one parameter pertaining to a disk array in a disk subsystem by a specialist software in a processor in the disk subsystem, wherein the collecting step comprises:

(a1) requesting at least one disk characteristic pertaining to the disk array from a user at an open system host, (a2) sending a request from an expert in the open system host to the specialist software for the at least one parameter, wherein the at least one parameter is relevant to the at least one disk characteristic, and (a13) collecting the at least one parameter by the specialist software from microcode in the processor according to the request;

(b) transferring the at least one parameter from the processor to the open system host; and (c) calculating disk utilization based upon the at least one parameter.

2. The method of claim 1, wherein the transferring step (b) comprises:

(b1) transferring the at least one parameter from the specialist software in the processor to an expert software in the open system host.

3. The method of claim 1, wherein the calculating step (c) comprises:

(c1) calculating the disk utilization by an expert software in the open system host based upon the at least one parameter.

4. The method of claim 3, wherein the calculating step (c1) comprises:

(c1i) receiving the at least one parameter from the specialist software in the processor;

(c1ii) storing the at least one parameter in a database on the open system host; and (c1iii) calculating the disk utilization using a disk utilization routine in the expert software.

5. The method of claim 1 further comprising:

(d) displaying a report which comprises the disk utilization.

6. The method of claim 1, wherein the at least one parameter comprises:

a time interval in seconds (T);

a number of disks in the disk array (N);

milliseconds of read time in the time interval (MR);

milliseconds of write time in the time interval (MW);

a total number of writes in the time interval (W); and number of stride write destages in the time interval (S).

7. The method of claim 6, wherein the disk utilization, U, is obtained from a formula $U=1/(1000*T*N)*(MR+(MW/2W-S)*(4*(W-S)+N*S))$.

8. The method of claim 1, wherein the disk subsystem is an Enterprise Storage Server (ESS) disk subsystem.

9. The method of claim 1, wherein the open system host is a UNIX or Windows system host.

10. A computer system, comprising:
   a disk subsystem, comprising:
      a disk array, and
      a processor coupled to the disk array, the processor capable of collecting at least one parameter pertaining to the disk array and transferring the at least one parameter to an open system host, wherein the processor comprises:
         microcode, the microcode comprising the at least one parameter, and a specialist software for collecting the at least one parameter from the microcode and transferring the at least one parameter to the open system host; and
   the open system host coupled to the disk subsystem, the open system host capable of receiving the at least one parameter and calculating a disk utilization based upon the at least one parameter.

11. The system of claim 10, wherein the open system host comprises:
   an expert software for receiving the at least one parameter, the expert comprising a disk utilization routine for calculating the disk utilization based upon the at least one parameter.

12. The system of claim 10, wherein the open system host further comprises:
   a database for storing the at least one parameter.

13. The system of claim 10, wherein the at least one parameter comprises:
   a time interval in seconds (T);
   a number of disks in the disk array (N);
   milliseconds of read time in the time interval (MR);
   milliseconds of write time in the time interval (MW);
   a total number of writes in the time interval (W); and
   a number of stride write destages in the time interval (S).

14. The system of claim 13, wherein the disk utilization, U, is obtained from a formula $U=1/(1000*T*N)*(MR+(MW/2W-S)*(4*(W-S)+N*S))$.

15. The system of claim 10, wherein the disk subsystem is an ESS disk subsystem.

16. The system of claim 10, wherein the open system host is a UNIX or Windows system host.

17. A method for reporting disk utilization in a computer system, comprising the steps of:
   (a) collecting at least one parameter pertaining to a disk array in a disk subsystem by a specialist software in a processor in the disk subsystem, wherein the collecting step (a) comprises:
      (a1) requesting at least one disk characteristic pertaining to the disk array from a user at the open system host,
      (a2) sending a request from an expert software to the specialist software for the at least one parameter, wherein the at least one parameter is relevant to the at least one disk characteristic, and
      (a3) collecting the at least one parameter by the specialist software from microcode in the processor according to the request;
   (b) transferring the at least one parameter from the specialist software to the expert software in an open system host; and
   (c) calculating disk utilization by the expert software based upon the at least one parameter.

18. The method of claim 17, wherein the calculating step (c) comprises:
   (c1) receiving the at least one parameter from the specialist software;
   (c2) storing the at least one parameter in a database on the open system host; and
   (c3) calculating the disk utilization using a disk utilization routine in the expert software.

19. The method of claim 17, further comprising:
   (d) displaying a report which comprises the disk utilization.

20. The method of claim 17, wherein the at least one parameter comprises:
   a time interval in seconds (T);
   a number of disks in the disk array (N);
   milliseconds of read time in the time interval (MR);
   milliseconds of write time in the time interval (MW);
   a total number of writes in the time interval (W); and
   a number of stride write destages in the time interval (S).

21. The method of claim 20, wherein the disk utilization, U, is obtained from a formula $U=1/(1000*T*N)*(MR+(MW/2W-S)*(4*(W-S)+N*S))$.

22. The method of claim 17, wherein the disk subsystem is an ESS disk subsystem.

23. The method of claim 17, wherein the open system host is a UNIX or Windows system host.

24. A computer system, comprising:
   a disk subsystem, comprising:
      a disk array; and
      a processor coupled to the disk array, comprising a specialist software for collecting at least one parameter pertaining to the disk array and transferring the at least one parameter to an open system host, wherein the processor further comprises microcode, wherein the microcode comprises the at least one parameter; and
   the open system host coupled to the disk subsystem, comprising an expert software for receiving the at least one parameter and calculating a disk utilization based upon the at least one parameter.

25. The system of claim 24, wherein the expert software comprises a disk utilization routine for calculating the disk utilization based upon the at least one parameter.

26. The system of claim 24, wherein the at least one parameter comprises:
   time interval in seconds (T);
   a number of disks in the disk array (N);
   milliseconds of read time in the time interval (MR);
   milliseconds of write time in the time interval (MW);
   a total number of writes in the time interval (W); and
   a number of stride write destages in the time interval (S).

27. The system of claim 26, wherein the disk utilization, U, is obtained from a formula $U=1/(1000*T*N)*(MR+(MW/2W-S)*(4*(W-S)+N*S))$.

28. A method for reporting disk utilization in a computer system, comprising the steps of:
   (a) requesting at least one disk characteristic pertaining to a disk array in a disk subsystem by a user at an open system host;
   (b) sending a request for the at least one parameter from an expert software in the open system host to a specialist software in a processor in the disk subsystem, wherein the at least one parameter is relevant to the at least one disk characteristic;

(c) collecting the at least one parameter by the specialist software from microcode in the processor according to the request;

(d) transferring the at least one parameter from the specialist software to the expert software;

(e) storing the at least one parameter in a database on the open system host; and (f) calculating a disk utilization using a disk utilization routine in the expert software.

29. The method of claim 28, further comprising:

(g) displaying a report which comprises the disk utilization.

30. The method of claim 28, wherein the at least one parameter comprises:

a time interval in seconds (T);
a number of disks in the disk array (N);
milliseconds of read time in the time interval (MR);
milliseconds of write time in the time interval (MW);
a total number of writes in the time interval (W); and
a number of stride write destages in the time interval (S).

31. The method of claim 30, wherein the disk utilization, U, is obtained from a formula $U=1/(1000*T*N)*(MR+(MW/2W-S)*(4*(W-S)+N*S))$.

32. The method of claim 28, wherein the disk subsystem is an ESS disk subsystem.

33. The method of claim 28, wherein the open system host is a UNIX or Windows system host.

34. A computer readable medium with computer instructions for reporting disk utilization in a computer system, the instructions for:

(a) collecting at least one parameter pertaining to a disk array in a disk subsystem by a specialist software in a processor in the disk subsystem, wherein the collecting instructions comprises instructions for:

(a1) requesting at least one disk characteristic pertaining to the disk array from a user at an open system host, (a2) sending a request from an expert in the open system host to the specialist software for the at least one parameter, wherein the at least one parameter is relevant to the at least one disk characteristic, and (a3) collecting the at least one parameter by the specialist software from microcode in the processor according to the request;

(b) transferring the at least one parameter from the processor to the open system host; and (c) calculating disk utilization based upon the at least one parameter.

35. A method for reporting disk utilization in a computer system, comprising the steps of:

(a) collecting at least one parameter pertaining to a disk array in a disk subsystem by a processor in the disk subsystem, wherein the at least one parameter comprises:

a time interval in seconds (T),
a number of disks in the disk array (N),
milliseconds of read time in the time interval (MR),
milliseconds of write time in the time interval (MW),
a total number of writes in the time interval (W), and
a number of stride write destages in the time interval (S);

(b) transferring the at least one parameter from the processor to an open system host; and (c) calculating disk utilization based upon the at least one parameter.

36. A computer system, comprising:

a disk subsystem, comprising:
a disk array, and
a processor coupled to the disk array, the processor capable of collecting at least one parameter pertaining to the disk array and transferring the at least one parameter to an open system host, wherein the at least one parameter comprises:
a time interval in seconds (T),
a number of disks in the disk array (N),
milliseconds of read time in the time interval (MR),
milliseconds of write time in the time interval (MW),
a total number of writes in the time interval (W), and
a number of stride write destages in the time interval (S); and the open system host coupled to the disk subsystem, the open system host capable of receiving the at least one parameter and calculating a disk utilization based upon the at least one parameter.

37. A method for reporting disk utilization in a computer system, comprising the steps of:

(a) collecting at least one parameter pertaining to a disk array in a disk subsystem by a specialist software in a processor in the disk subsystem, wherein the at least one parameter comprises:

a time interval in seconds (T),
a number of disks in the disk array (N),
milliseconds of read time in the time interval (MR),
milliseconds of write time in the time interval (MW),
a total number of writes in the time interval (W), and
a number of stride write destages in the time interval (S);

(b) transferring the at least one parameter from the specialist software to an expert software in an open system host; and (c) calculating disk utilization by the expert software based upon the at least one parameter.

38. A computer system, comprising:

a disk subsystem, comprising:
a disk array, and
a processor coupled to the disk array, comprising a specialist software for collecting at least one parameter pertaining to the disk array and transferring the at least one parameter to an open system host, wherein the at least one parameter comprises:
a time interval in seconds (T),
a number of disks in the disk array (N),
milliseconds of read time in the time interval (MR),
milliseconds of write time in the time interval (MW),
a total number of writes in the time interval (W), and
a number of stride write destages in the time interval (S); and the open system host coupled to the disk subsystem, comprising an expert software for receiving the at least one parameter and calculating a disk utilization based upon the at least one parameter.

* * * * *